United States Patent [19]

Barnes et al.

[11] 4,056,434

[45] Nov. 1, 1977

[54] LIQUID METAL COOLED NUCLEAR REACTOR SCANNING APPARATUS

[75] Inventors: Sidney Barnes, Warrington; John Roderick Fothergill, Lymm, both of England

[73] Assignee: United Kingdom Atomic Energy Authority, United Kingdom

[21] Appl. No.: 631,650

[22] Filed: Nov. 13, 1975

[30] Foreign Application Priority Data

Dec. 12, 1974 United Kingdom ............... 53863/74

[51] Int. Cl.² ............................................. G21C 17/02
[52] U.S. Cl. .................................. 176/19 R; 176/38; 176/40
[58] Field of Search .................. 176/19 R, 38, 40; 340/1 L, 11 R; 73/71.5

[56] References Cited

U.S. PATENT DOCUMENTS

| 3,240,674 | 3/1966 | Ledwidge | 176/19 R |
| 3,264,863 | 8/1966 | Maropis | 176/19 R |
| 3,308,652 | 3/1967 | Appel et al. | 73/71.5 V |
| 3,320,797 | 5/1967 | Tajiri et al. | 73/71.5 V |
| 3,512,401 | 5/1970 | Thalmann | 73/71.5 V |

*Primary Examiner*—Samuel W. Engle
*Assistant Examiner*—S. A. Cangialosi
*Attorney, Agent, or Firm*—Larson, Taylor and Hinds

[57] ABSTRACT

A liquid metal cooled nuclear reactor has scanning means whereby ultra sound is transmitted between a transducer unit and objects in the pool of reactor coolant by way of a liquid wave guide. The wave guide is created by drawing liquid metal from the pool of coolant into a dip pipe to submerge the transducer unit. The liquid metal is drawn up in two stages with a cooling period between the stages.

5 Claims, 6 Drawing Figures

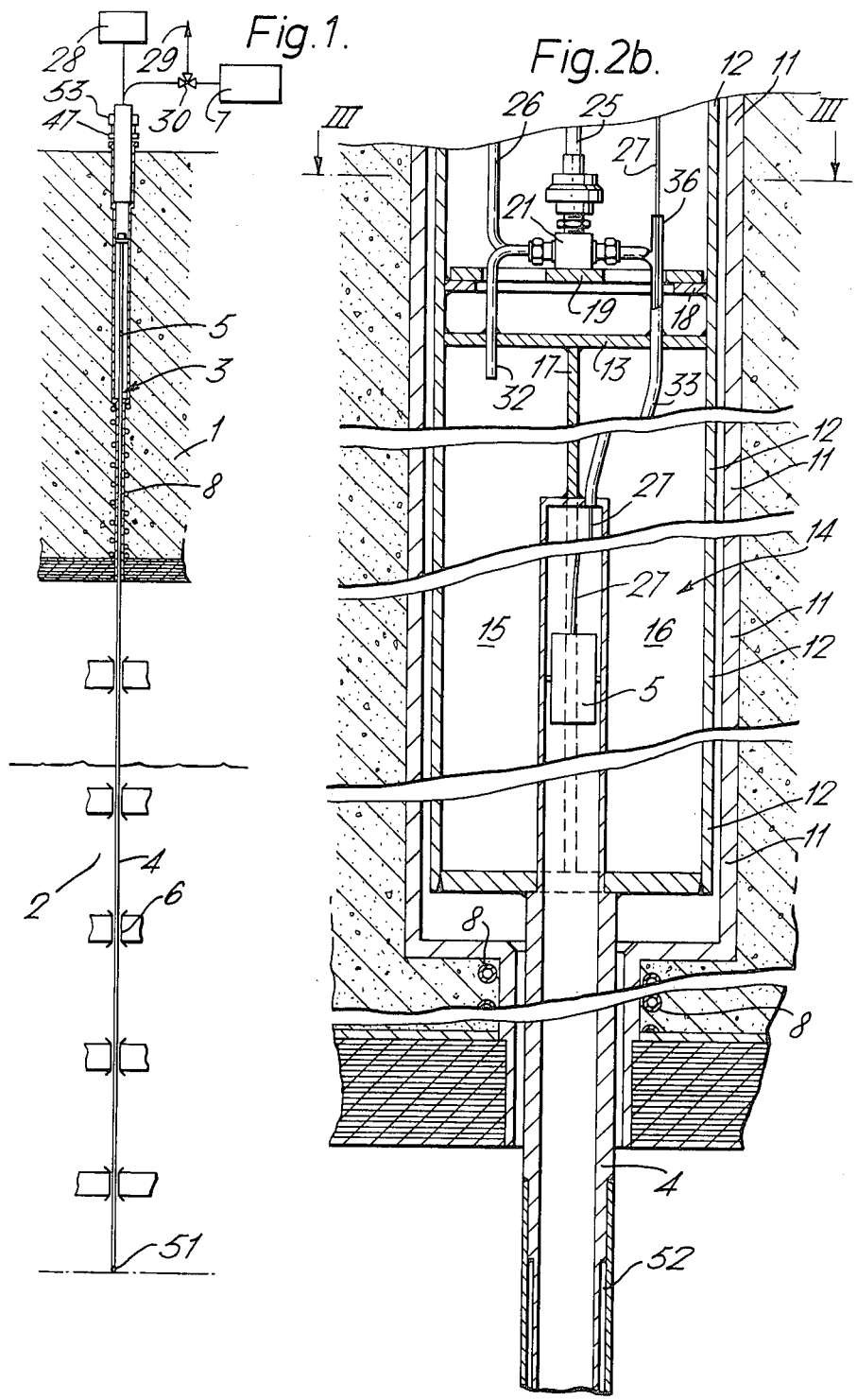

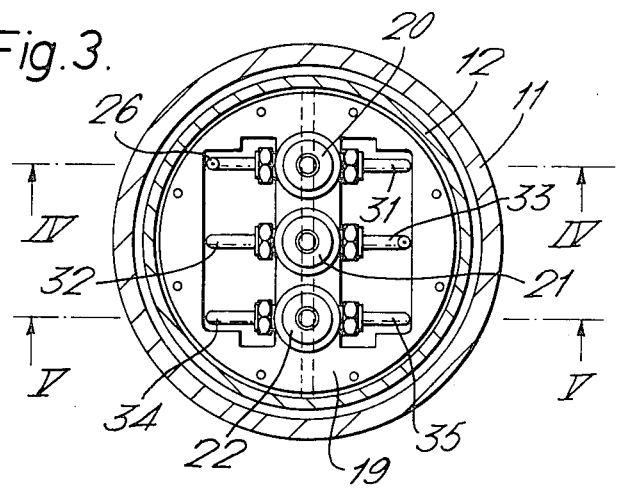
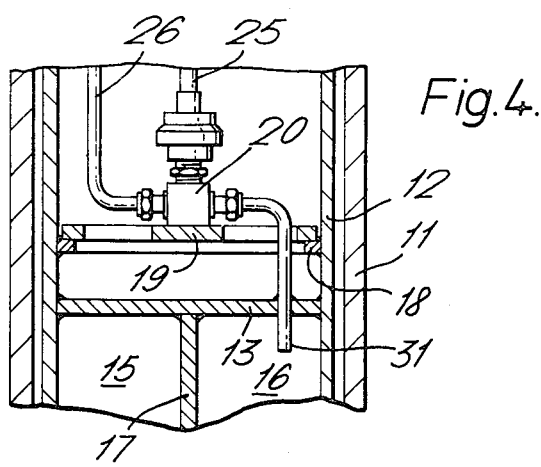
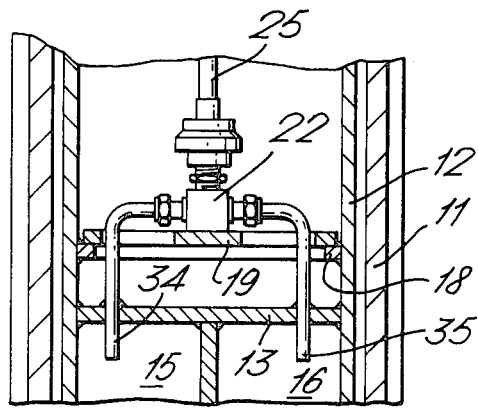

LIQUID METAL COOLED NUCLEAR REACTOR SCANNING APPARATUS

BACKGROUND OF THE INVENTION

This invention relates to liquid metal cooled nuclear reactor constructions.

In one kind of construction of liquid metal cooled nuclear reactor generally known as of the pool kind, the reactor core, heat exchangers and coolant circulating pumps are submerged in a pool of liquid metal coolant. In operation of the nuclear reactor it is necessary to be able to locate and identify components submerged in the pool and before moving rotating shields in the roof of the pool containing vault it is necessary to ensure that all the normally suspended absorber rods have been inserted in the core and released from their suspensions. Television cameras are unsuitable for use in the opaque liquid metal but ultrasound in the mega hertz range has been used to give a television screen kind of display. There is some difficulty in transmitting ultrasound signals from a transducer into the pool of coolant because the transducer must be protected from the high temperature environment of the reactor coolant but this difficulty has been partially overcome by transmitting the signals by way of a wave guide extending from the transducer into the pool of coolant. Such a wave guide may comprise a column of liquid metal within a dip tube. However, in order to support the column of liquid metal in the dip tube and to isolate it from the liquid metal of the pool a diaphragm has been used but the diaphragm causes unwanted attenuation of the transmitted signals.

An object of the invention is to provide a liquid metal cooled nuclear reactor construction having means for transmitting ultrasonic signals into and from a pool of reactor coolant by way of a liquid wave guide comprising a column of reactor coolant which is uninterrupted by a diaphragm.

SUMMARY OF THE INVENTION

According to the invention, in a liquid metal cooled nuclear reactor construction having an ultrasonic transducer unit for generating and receiving signals and means for creating a liquid metal wave guide for transmission of the signals into and from a pool of coolant, the means comprises a vertical dip tube housing the transducer, vacuum apparatus for drawing a column of liquid metal from the pool into the dip tube in a plurality of stages, and means for cooling the upper region of the column between lifting stages and before submersion of the transducer unit.

The invention also resides in a method of scanning a pool of coolant of a liquid metal cooled nuclear reactor, the method comprising the consecutive steps of: partially filling a dip tube which houses a transducer unit with liquid metal coolant by applying vacuum to the tube to draw up a column of liquid metal from the pool of coolant to a level below the transducer unit; cooling the upper region of the liquid metal column; extending the column by drawing additional metal coolant into the tube sufficient to submerge the transducer unit; generating ultrasonic signals by means of the transducer unit, transmitting the generated signals into the pool of coolant by way of the column of liquid metal and transmitting reflected signals by way of the column of liquid metal to the transducer unit and to signal display or recording apparatus. The apparatus and method enable a liquid metal wave guide for ultrasonic signals to be established when required without the need for a diaphragm in the wave guide to isolate a cool column of liquid metal from the hot coolant of the reactor thereby improving the efficiency of signal transmission.

DESCRIPTION OF THE DRAWINGS

A construction of liquid metal cooled nuclear reactor will now be described, by way of example, with reference to the accompanying drawings wherein:

FIG. 1 is a diagrammatic illustration of a dip tube extending into a pool of reactor coolant, FIGS. 2a and 2b are fragmentary sectional views of a schematic arrangement of the dip tube shown in FIG. 1 and drawn to a larger scale, FIG. 3 is plan view in cross-section on line III — III of FIG. 2b, FIG. 4 is a fragmentary sectional view on line IV — IV of FIG. 3 and FIG. 5 is a fragmentary sectional view on line V — V of FIG. 3.

DESCRIPTION OF THE PREFERRED EMBODIMENT

Figure 2A:
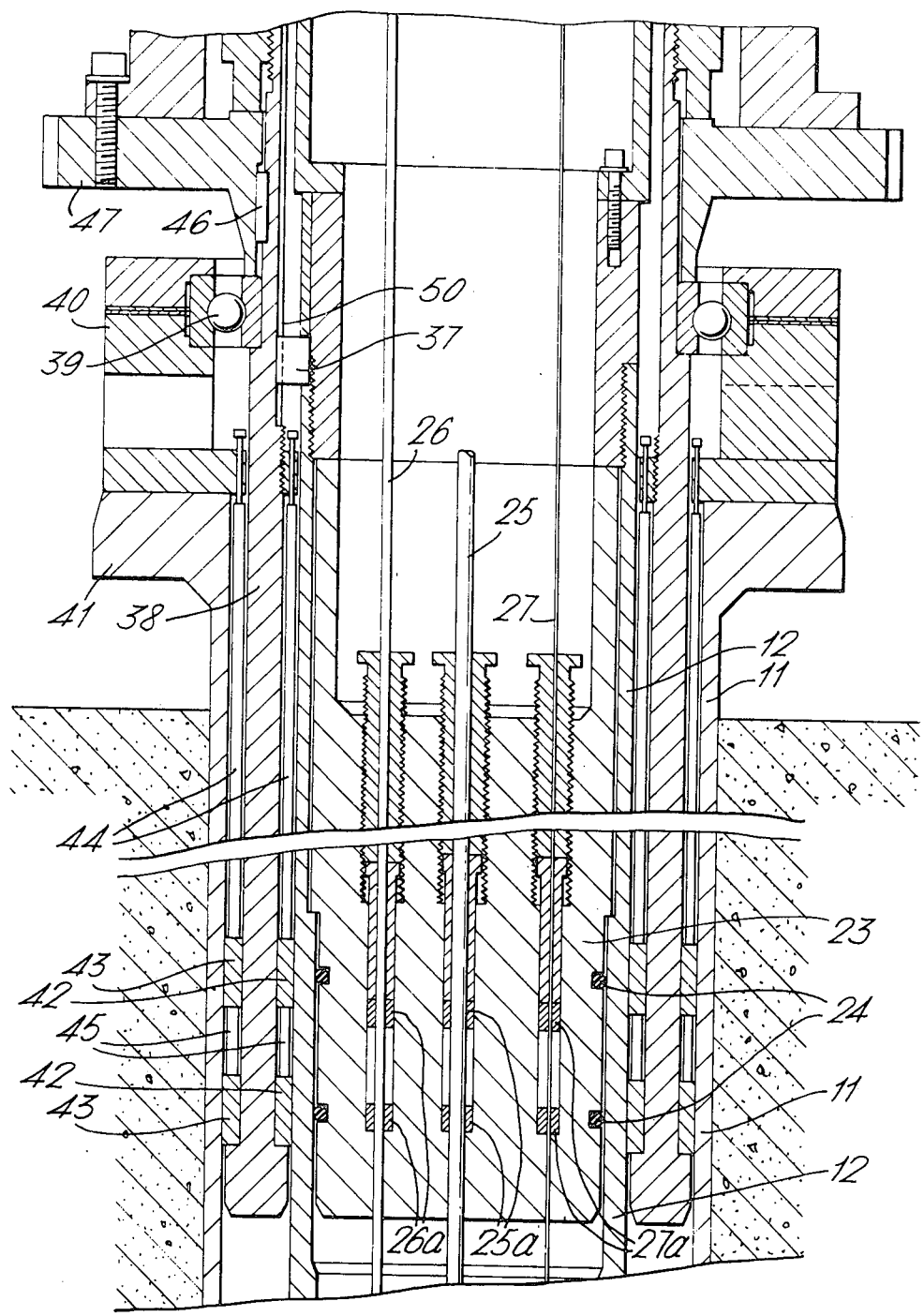

Referring to FIG. 1, the reactor containing concrete vault shown therein is designated 1 and it contains a pool 2 of liquid sodium coolant. The construction has ultrasonic signal generating and transmitting means 3 for scanning the pool of sodium. The generating and transmitting means 3 comprises a dip tube 4 housing an ultrasonic transducer unit 5 and slidably guided by brackets 6. There is vacuum apparatus 7 for lifting reactor coolant into the tube and cooling coils 8 (for circulating cooling fluid) embedded in the concrete about the upper regions of the dip tube 4. The vacuum apparatus is arranged so that liquid sodium can be drawn into the dip tube in two lifts, firstly, to a level within the cooling coil region, then, after a period of cooling, to a level at which the transducer unit 5 is submerged. Thus the transducer unit is submerged in liquid sodium which is at a tolerable temperature and there is a continuous wave guide extending from the transducer unit to within the pool of reactor coolant. A mirror 51 is pivotably mounted at the lower end of the dip tube.

In operation, ultrasonic signals are generated by the transducer unit and transmitted along the wave guide to the lower end of the dip tube, thence transversely across the pool 2 of coolant by means of the mirror.

The dip tube 4 is rotatable about the longitudinal axis and the mirror is pivotable about a horizontal axis so that most regions of the pool of coolant can be scanned. The signals reflected from reactor components in the pool or from the side of the pool containing vessel are returned to the transducer unit 5 by the same route thence to display apparatus 28 disposed outside the reactor vault.

Referring now to FIGS. 2a and 2b, shown therein in greater detail is the apparatus for effecting the two lifts of liquid sodium into the dip tube. The concrete is penetrated by a tubular housing 11 and the dip tube 4, at its upper end, penetrates the closed end of an inverted thimble member 12.

The member 12 has a transverse closure plate 13 which defines a gas tight chamber 14 in the member and the chamber is divided into sub-chambers 15, 16 by a dividing plate 17 welded to the thimble member 12, the transverse plate 13 and the dip tube 4. The sub-chambers 15, 16 define first and second vacuum reservoirs respectively. The thimble member has an internal flange 18 carrying a support plate 19 for three fluid flow valves 20, 21, 22. (FIG. 3) The thimble member 12 has a closure plug 23 sealed to the member 12 by 'O' rings 24. The closure plug 23 has three penetrations with glands 25a for operating spindles 25 for the valves. The closure plug 23 also has further penetrations one each for a pipe 26 and a signal conducting lead 27. The lead 27 connects the transducer unit 5 to conventional apparatus 28 (shown diagrammatically in FIG. 1) for generating, receiving and analysing ultrasonic waves. The penetrations have seals 27a and 26a. The pipe 26 is connectable to the vacuum source 7 and to vent 29 outside the reactor vault, as shown in FIG. 1, by way of a three-way valve 30. The pipe 26 is connectable with the sub-chamber 16 by way of the valve 20 and a pipe 31 as shown in FIG. 4. The sub-chamber 15 is connectable with a closed upper end of the dip pipe 4 by way of the valve 21 and pipes 32, 33 as shown in FIG. 2b, and the two sub-chambers 15, 16 are inter-connectable by way of the valve 22 and pipes 34, 35 as shown in FIG. 5. The lead 27 extending from the transducer unit to the apparatus 28 passes through the end wall of the dip tube 4 within the pipe 33 and sealingly penetrates the wall of the pipe 33 by way of a branch 36.

The thimble member 12 is keyed at 37 to an outer sleeve 38 both being rotatable in the housing 11 on a bearing 39. The bearing 39 is carried by a support ring 40 from a flange 41 of the housing 11.

Annular sealing members 42, 43 are provided internally and externally of the outer sleeve 38 the seals being longitudinally located by tubes 44 and spaced apart by tubular pieces 45. The outer sleeve 38 is keyed at 46 to a gear wheel 47 through which rotation of the outer sleeve 38 — thimble member 12 — dip tube 4 combination is effected. To enable the thimble member 12 and the dip tube 4 to move longitudinally relative to the housing 11 the key 37 is movable in an extended keyway 50 in the outer sleeve 38. The dip tube is lowered to an operational position in the pool before commencing a scanning operation by means of a screw and nut mechanism designated 53 in FIG. 1 and is raised again after completing the scan and before recommencing reactor operation. The screw and nut mechanism comprises a male thread formed on an extension of the outer sleeve 38 and a complementary female thread in a nut having a gear drive similar to gear wheel 47. The dip tube has a gas filled jacket 52 to prevent ultrasound radiating into the surrounding medium.

In operation to scan the pool of liquid coolant, the dip pipe is first lowered to its operational position wherein the lower end is dipped into the pool and is then charged with liquid sodium from the pool. Charging is effected in four stages. Firstly, the valves 20, 22 and 30 are opened to connect the sub-chamber 16 (and the sub-chamber 15 by way of pipes 34, 35) to a vacuum source, valve 21 being closed. Secondly, the valves 20 and 22 are closed and valve 21 opened to connect the evacuated sub-chamber 15 with the dip tube 4 so that a first lift of liquid sodium is drawn into the dip tube. The capacity of the sub-chamber is such that liquid metal is drawn into the dip tube to a level within the region of the cooling coils. Thirdly, the upper regions of the column of liquid metal is cooled to a temperature compatible with the transducer unit 5 (approximately 250° C) by cooling water passing through the coils 8 and then fourthly, valve 22 is opened to connect the evacuated sub-chamber 16 with sub-chamber 15 so that a second lift of liquid sodium is drawn into the dip tube 4. The capacity of the sub-chamber 16 is such that liquid metal is drawn into the dip tube sufficiently to submerge the transducer unit. To scan the pool of liquid metal coolant, the transducer is energised by way of lead 27 to generate ultrasonic signals which are transmitted along the newly created wave guide and directed into the pool by the mirror 51. By rotating the dip tube 4 and pivoting the mirror 51 signals can be directed into almost all the regions of the pool. The signals are reflected from components in the pool or from the wall of the pool containing vessel and are directed by the mirror and wave guide back to the transducer units. Electrical signals responsive to the reflected ultrasonic signals are conducted to the apparatus 28.

After a scanning operation, with valve 30 closed to the vacuum source and open to vent, the valves 20, 21, 22 can be opened to return the liquid metal in the dip tube 4 to the pool of coolant by gravity thereby avoiding subsequent freezing of the liquid metal in the dip tube. The submerged open lower end of the dip tube is finally withdrawn from the pool of coolant to prevent interference between the core structure and the dip tube due to differential expansion.

We claim:

1. A liquid metal cooled nuclear reactor construction comprising: a vault containing a pool of liquid metal coolant; a vertical dip tube extending into the pool of coolant; a transducer unit for generating ultra-sound signals housed within the dip tube and disposed above the pool of coolant; a vacuum source connectable to an upper closed end of the dip tube for drawing a column of liquid metal from the pool into the dip tube; first and second vacuum reservoirs connected in series between the dip tube and the vacuum source; fluid flow isolating valves disposed one each between the dip tube and the first vacuum reservoir, between the first and second vacuum reservoirs and between the second vacuum reservoir and the vacuum source; and means for cooling the upper region of the column of liquid metal between two lifting stages and before submersion of the transducer in liquid metal.

2. A liquid metal cooled nuclear reactor construction according to claim 1 wherein the means for cooling the upper region of the column of liquid metal comprises fluid conducting heat exchange coils wound about an intermediate region of the dip tube.

3. A liquid metal cooled nuclear reactor construction according to claim 1 wherein there is a mirror pivotably mounted about a horizontal axis at the lower end of the dip tube and disposed for deflecting the path of the signals.

4. A liquid metal cooled nuclear reactor construction according to claim 3 wherein there is gear drive means for rotating the dip tube about its longitudinal axis and screw thread means for displacing the dip tube along its longitudinal axis.

5. A liquid metal cooled nuclear reactor construction according to claim 4 wherein the dip tube has a gas filled jacket.

* * * * *